(12) United States Patent
Koizumi

(10) Patent No.: US 9,657,508 B2
(45) Date of Patent: May 23, 2017

(54) GEARED MOTOR AND POWER WINDOW DEVICE

(71) Applicant: ASMO CO., LTD., Shizuoka-ken (JP)

(72) Inventor: Takuya Koizumi, Toyohashi (JP)

(73) Assignee: ASMO CO., LTD., Shizuoka-ken (JP)

( * ) Notice: Subject to any disclaimer, the term of this patent is extended or adjusted under 35 U.S.C. 154(b) by 0 days.

(21) Appl. No.: 15/063,101

(22) Filed: Mar. 7, 2016

(65) Prior Publication Data
US 2016/0265262 A1 Sep. 15, 2016

(30) Foreign Application Priority Data

Mar. 11, 2015 (JP) .................................. 2015-048317

(51) Int. Cl.
| | | |
|---|---|---|
| *E05F 15/08* | (2006.01) | |
| *E05F 15/697* | (2015.01) | |
| *F16H 57/12* | (2006.01) | |
| *F16H 19/06* | (2006.01) | |
| *B60J 1/08* | (2006.01) | |
| *F16H 1/16* | (2006.01) | |

(52) U.S. Cl.
CPC .............. *E05F 15/697* (2015.01); *B60J 1/08* (2013.01); *F16H 19/06* (2013.01); *F16H 57/12* (2013.01); *E05Y 2201/434* (2013.01); *E05Y 2900/55* (2013.01); *F16H 1/16* (2013.01)

(58) Field of Classification Search
CPC ........ E05F 15/697; F16H 57/12; F16H 19/06; F16H 1/16; B60J 1/08; E05Y 2201/434
USPC .......................................... 49/348, 349, 352
See application file for complete search history.

(56) References Cited

U.S. PATENT DOCUMENTS

| | | | | |
|---|---|---|---|---|
| 4,503,732 | A | * | 3/1985 | Schust .................. E05F 11/382 254/339 |
| 4,534,233 | A | * | 8/1985 | Hamaguchi ........... E05F 11/485 49/352 |
| 4,770,056 | A | * | 9/1988 | Becker .................. E05F 11/483 49/352 |

(Continued)

FOREIGN PATENT DOCUMENTS

| | | | | |
|---|---|---|---|---|
| JP | 2023009 | A1 * | 2/2009 | .......... B62D 5/0409 |
| JP | 2009-068628 | A | 4/2009 | |

(Continued)

*Primary Examiner* — Jerry Redman
(74) *Attorney, Agent, or Firm* — Patterson Thuente Pedersen, P.A.

(57) ABSTRACT

A geared motor includes a motor and a reduction drive. The reduction drive includes a gear housing, a speed reduction-output member, and a restriction portion. The gear housing includes a support shaft. The speed reduction-output member includes a reduction gear, an output gear meshed with an input member, and an accommodation recess. The speed reduction-output member is rotationally supported by the support shaft. The restriction portion is configured to restrict movement of the speed reduction-output member relative to the support shaft. The restriction portion is located between an outer circumferential surface of the support shaft and an inner circumferential surface of the accommodation recess. The restriction portion is located in an axial direction of the support shaft at a position that differs from a portion where the speed reduction-output member abuts in a radial direction against the input member.

3 Claims, 5 Drawing Sheets

(56) References Cited

U.S. PATENT DOCUMENTS

| | | | | |
|---|---|---|---|---|
| 5,178,026 A * | 1/1993 | Matsumoto | ............... | F16D 3/74 |
| | | | | 464/73 |
| 5,267,482 A * | 12/1993 | Yoshida | ................... | F16D 3/58 |
| | | | | 464/149 |
| 5,564,231 A * | 10/1996 | Tajima | .................. | E05F 15/697 |
| | | | | 49/352 |
| 6,408,572 B1 * | 6/2002 | Uchimura | ............. | E05F 11/485 |
| | | | | 464/92 |
| 8,671,621 B2 * | 3/2014 | Yoshida | ............... | E05F 11/486 |
| | | | | 49/352 |
| 2002/0046497 A1 * | 4/2002 | Le Gallo | ............... | E05F 11/483 |
| | | | | 49/352 |
| 2009/0071280 A1 | 3/2009 | Nakagawa | | |
| 2010/0043294 A1 * | 2/2010 | Klippert | ............... | E05F 11/483 |
| | | | | 49/352 |

FOREIGN PATENT DOCUMENTS

| | | |
|---|---|---|
| JP | 2011-114887 A | 6/2011 |
| JP | 2013-108549 A | 6/2013 |
| JP | 2013-240170 A | 11/2013 |
| JP | 2014-407990 A | 6/2014 |

* cited by examiner

GEARED MOTOR AND POWER WINDOW DEVICE

BACKGROUND OF THE INVENTION

The present invention relates to a geared motor and a power window device that includes a geared motor as a drive source.

Japanese Laid-Open Patent Publication No. 2013-108549 discloses an example of a geared motor including a motor and a reduction drive, which are integrally coupled to each other. A gear housing of the reduction drive includes a support shaft, a speed reduction-output member is rotationally supported by the support shaft. The speed reduction-output member includes a reduction gear (worm wheel in the above publication) that reduces a rotation speed of the motor and an output gear that is rotatable integrally with the reduction gear. The support shaft is fitted into the speed reduction-output member and inserted through the reduction gear and the output gear. The output gear of the speed reduction-output member is meshed with an input member, which is located outside the geared motor. Thus, the rotation produced by the motor is reduced in speed by the reduction gear and transmitted from the output gear to the input member.

Further, the geared motor includes a restriction portion. The restriction portion, which is accommodated in an accommodation recess of the output gear, restricts separation of the speed reduction-output member from the support shaft. The support shaft is inserted into the accommodation recess, and the restriction portion is located in a radial direction between an outer circumferential surface of the support shaft and an inner circumferential surface of the accommodation recess. The restriction portion is fixed to the support shaft and engaged with the accommodation recess of the speed reduction-output member in an axial direction of the support shaft. Thus, the restriction portion restricts movement of the speed reduce ion-output member relative to the support shaft.

However, in the above geared motor, when the output gear of the speed reduction-output member receives stress in the radial direction from the input member, the radial stress may be transmitted through the restriction portion to the support shaft and damage the support shaft.

SUMMARY OF THE INVENTION

It is an object of the present invention to provide a geared motor and a power window device that reduce radial stress transmitted from an input member through a speed reduction-output member and a restriction portion to a support shaft.

To achieve the above object, a geared motor according to one aspect of the present invention includes a motor and a reduction drive coupled integrally to the motor. The reduction drive includes a gear housing, a speed reduction-output member, and a restriction portion. The gear housing includes a support shaft. The speed reduction-output member includes a reduction gear that reduces a speed of rotation produced by the motor, an output gear that is rotatable integrally with the reduction gear and meshed with an input member, and an accommodation recess. The speed reduction-output member is fitted to the support shaft and rotationally supported by the support shaft. The restriction portion is configured to restrict movement of the speed reduction-output member relative to the support shaft. The restriction portion is located between an outer circumferential surface of the support shaft and an inner circumferential surface of the accommodation recess. The restriction portion is located in an axial direction of the support shaft at a position that differs from a portion where the speed reduction-output member abuts in a radial direction against the input member.

DETAILED DESCRIPTION OF THE PREFERRED EMBODIMENTS

One embodiment of a geared motor and a power window device will now be described.

Figure 1:
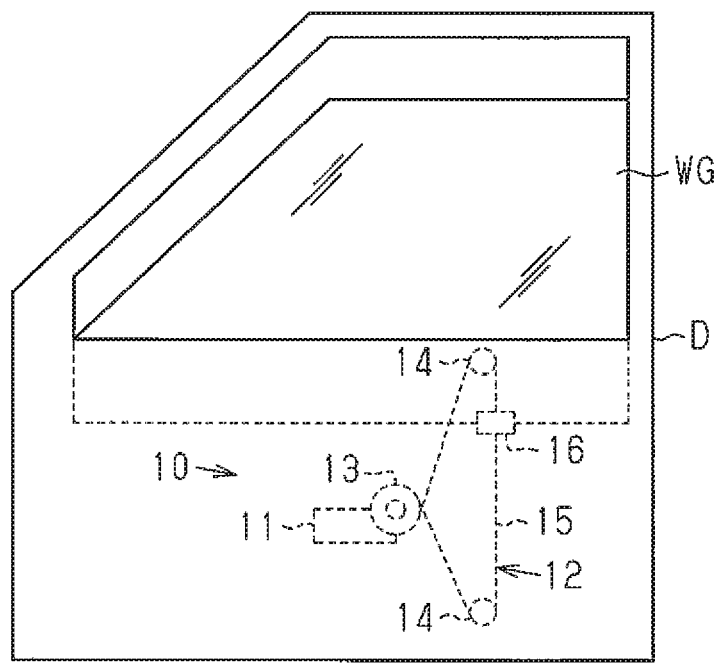
FIG. 1 is a schematic view showing a power window device according to one embodiment of the present invention.

As shown in FIG. 1, a power window device 10 of the present embodiment is coupled to a vehicle door D to open and close a window glass (window body) of the vehicle door D. The power window device 10 includes a geared motor 11 and a wire-type window regulator 12. The geared motor 11 is coupled to the vehicle door D. The window regulator 12 opens and closes the window glass WG when driven by the rotation produced by the geared motor 11.

The window regulator 12 includes a drive pulley 13, which is coupled to the geared motor 11, two driven pulleys 14, and a wire 15, which runs around the drive pulley 13 and the two driven pulleys 14. The drive pulley 13 functions as an input member, to which the output of the geared motor 11 is transmitted. A portion of the wire 15 that is located between the two driven pulleys 14 is held by a fixed member 16, which is fixed to the window glass WG. When the geared motor 11 is driven to rotate the drive pulley 13, the fixed member 16 is moved by the wire 15 in a direction that opens and closes the window glass WG. The movement of the fixed member 16 opens and closes (upwardly and downwardly moves) the window glass WG.

Structure of Geared Motor

Figure 2:
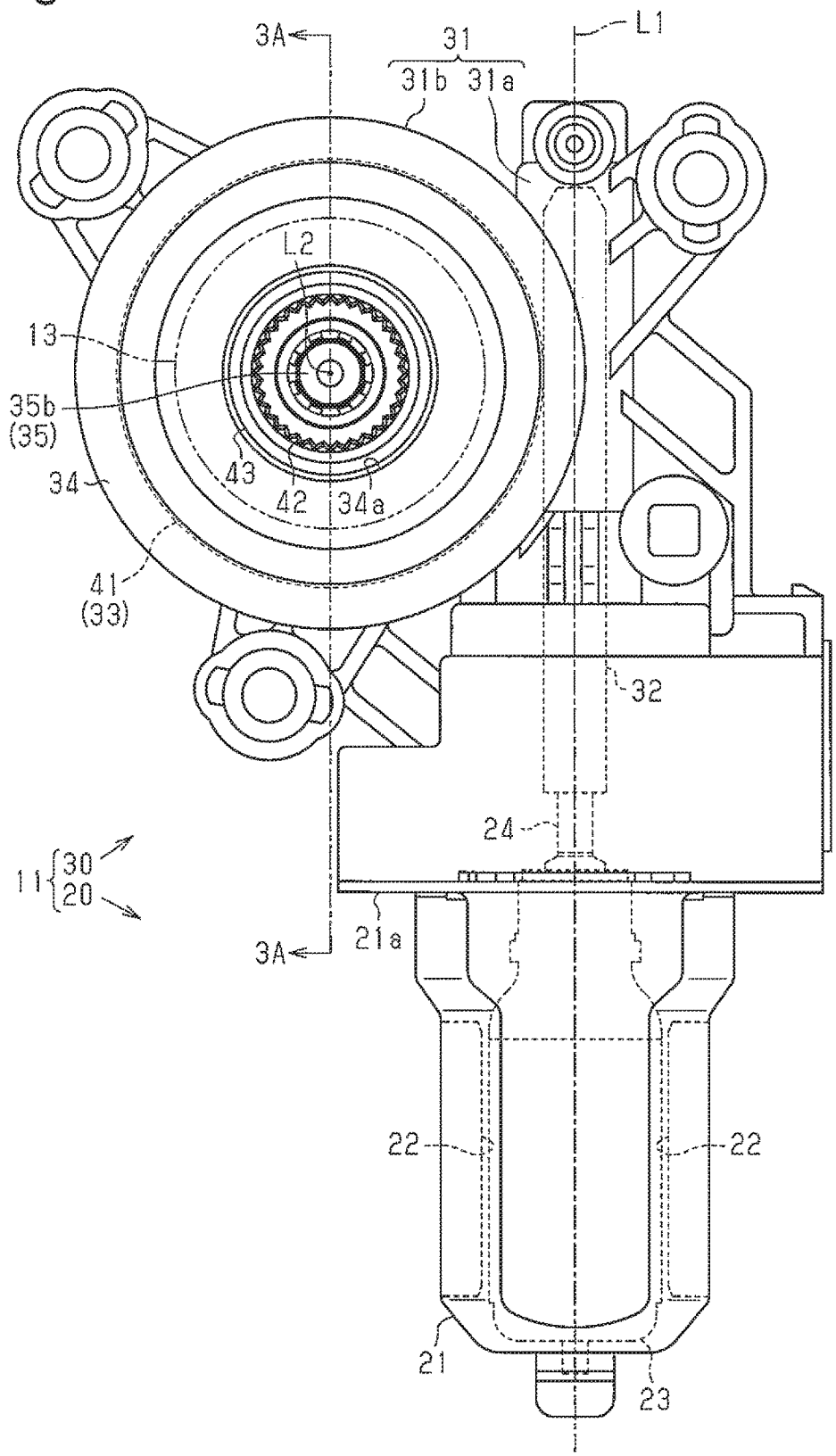
FIG. 2 is a front view of a geared motor shown in FIG. 1.

As shown in FIG. 2, the geared motor 11 includes a motor 20 and a reduction drive 30.

The motor 20 includes a yoke housing 21, two magnets 22, and an armature 23. The yoke housing 21 is cylindrical and has a closed end. The two magnets 22 are fixed to the inner circumference of the yoke housing 21. The armature 23 is rotationally supported by the yoke housing 21 and includes a rotation shaft 24 located at the center of the armature 23. The rotation shaft 24 includes a basal end (lower end in FIG. 2) rotationally supported by a bearing (not shown), which is coupled to the middle of the bottom of the yoke housing 21. Further, a brush (not shown) slides in contact with a commutator (not shown) of the armature 23. The brush is supplied with external power through a connector (not shown), and the commutator is supplied with power from the brush. A flange 21a extends from an open end of the yoke housing 21 in the radial direction. The flange 21a is fastened by screws (not shown) to a gear housing 31, which will be described later.

The reduction drive 30 includes the gear housing 31, a worm shaft 32, a speed reduction-output member 33, and a lid 34. The gear housing 31, which is formed from a resin, includes a shaft accommodation portion 31a and a wheel accommodation portion 31b. The shaft, accommodation portion 31a accommodates the worm shaft 32. The wheel accommodation portion 31b extends from the shaft accommodation portion 31a in a direction orthogonal to the axial direction of the worm shaft 32 (direction of axis L1 of rotation shaft 24). The worm shaft 32 is driven by and coupled to the rotation shaft 24, which extends from the motor 20, along the same axis L1.

Figure 3:
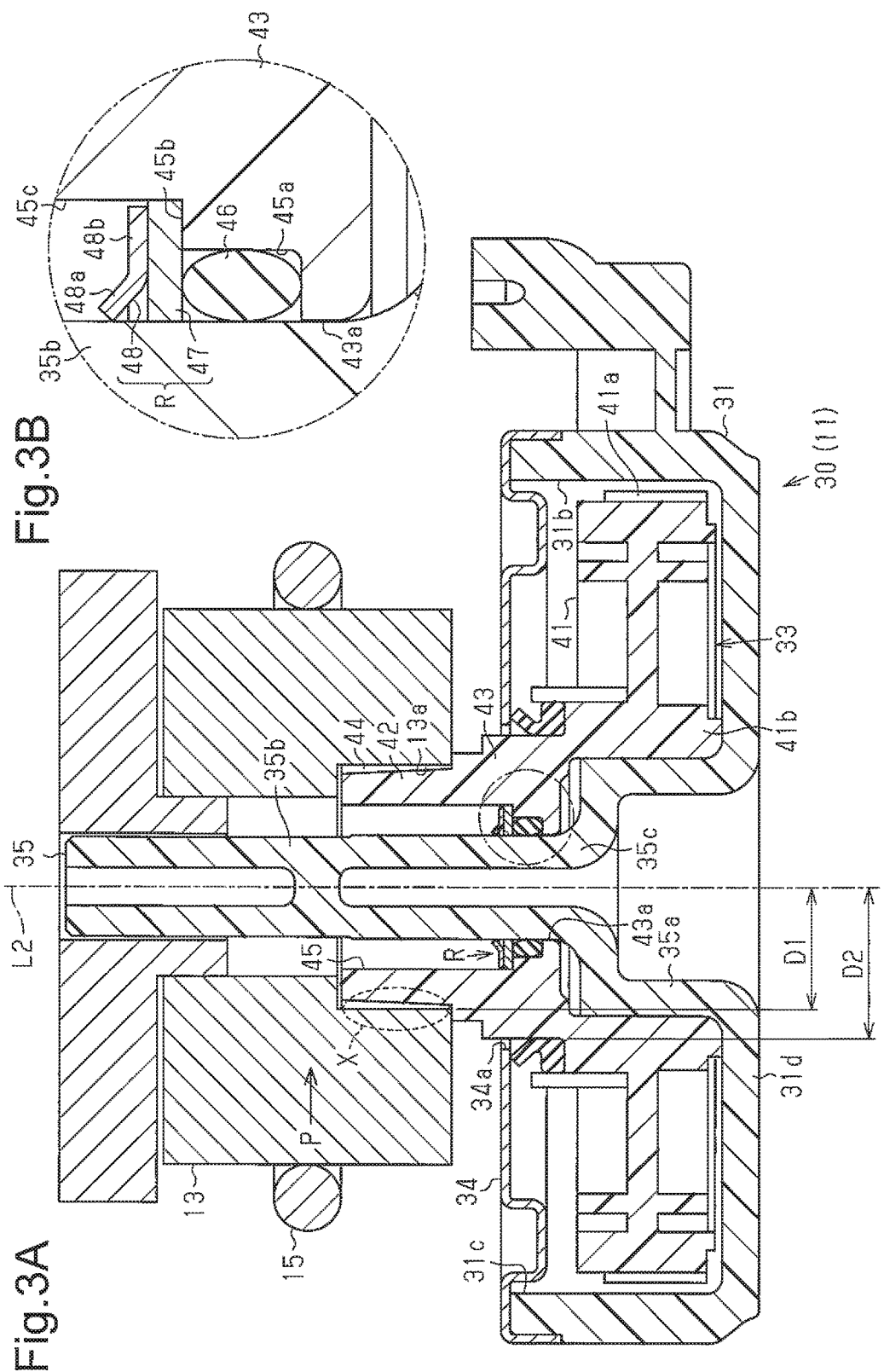
FIG. 3A is a cross-sectional view taken along line 3A-3A in FIG. 2 is a showing a reduction drive of the geared motor and a drive pulley that is coupled to the reduction drive.
FIG. 3B is a partially enlarged view of FIG. 3A.

As shown in FIG. 3A, the wheel accommodation portion 31b is cylindrical and has a closed end. The lid 34 is coupled to an open end 31c of the wheel accommodation portion 31b. The lid 34 is disk-shaped. A through hole 34a extends through the central portion, of the lid 34. The wheel accommodation portion 31b includes a center post 35 (support shaft), which extends from the center of the bottom 31d of the wheel accommodation portion 31b in a direction orthogonal to the extension direction of the wheel accommodation portion 31b (direction of axis L2 in FIG. 3A). The wheel accommodation portion 31b and the center post 35 are formed integrally with each other.

The center post 35 and the gear housing 31 are formed from the same material (resin material). The center post 35 includes a wheel shaft support 35a, which is located at the base of the center post 35, and a rod 33b, which extends from the wheel shaft support 35a in the direction of the axis L2. The wheel shaft support 35a and the rod 35b are cylindrical and extend about the axis L2. The wheel shaft support 35a has a larger outer diameter than the rod 35b. Further, the rod 35b is longer in the direction of the axis L2 than the wheel shaft support 35a. The rod 35b extends through the through hole 34a out of the lid 34. The drive pulley 13 is rotationally supported by the rod 35b.

Part of the speed reduction-output member 33 is fitted to the center post 35 so that the center post 35 supports part of the speed reduction-output member 33. The wheel accommodation portion 31b accommodates part of the speed reduction-output member 33. The speed reduction-output member 33, which is formed from, a resin material, includes a disk-shaped worm wheel 41 (reduction gear), an output gear 42, and a middle boss 43 (large-diameter portion). The worm wheel 41 is accommodated in the wheel accommodation portion 31b. The output gear 42 is exposed from the wheel accommodation portion 31b (lid 34). The middle boss 43 is located between the worm wheel 41 and the output gear 42. The worm wheel 41, the output gear 42, and the middle boss 43 are formed integrally with one another.

The worm wheel 41 includes teeth 41a, which are located on the outer circumferential portion of the worm wheel 41, and a wheel boss 41b, which is located in the central portion of the worm wheel 41. The teeth 41a are meshed with the worm shaft 32. The wheel boss 41b is tubular and extends about the axis L2 (central axis) of the center post 35. The wheel boss 41b is fitted to the wheel shaft support 35a of the center post 35. The worm wheel. 41 is supported by the wheel shaft support 35a rotation-ally about the axis L2. The wheel boss 41b includes a basal end that abuts against the bottom 31d of the wheel accommodation portion 31b in the direction of the axis L2.

A distal end of the wheel boss 41b includes the middle boss 43, which is tubular. The middle-boss 43 is circular and extends about the axis L2. The middle boss 43 is inserted through the through hole 34a of the lid 34. That is, part of the middle boss 43 is exposed to the outside of the lid 34. A gap extends between an outer circumferential surface of the middle boss 43 and an inner circumferential surface of the through hole 34a. Further, an inner circumferential portion of the middle boss 43 includes a circular support hole 43a, through which the rod 35b of the center post 35 is inserted. The support hole 43a slides in contact with an outer circumferential surface of the rod 35b.

The output gear 42, which is exposed to the outside of the lid 34, is located on a distal end of the middle boss 43 (side opposite to worm wheel). The middle boss 43 and the output gear 42 are formed integrally with each other. The output gear 42 is cylindrical and extends about the axis L2, and the outer circumference of the output gear 42 includes output teeth 44. The outer diameter D1 of the output gear 42 is smaller than the outer diameter D2 of the middle boss 43. The middle boss 43 functions as a large-diameter portion.

The drive pulley 13 of the window regulator 12 is coupled to the output gear 42. When the output gear 42 and the drive pulley 13 are coupled to each other, the teeth 44 of the output gear 42 are meshed with inner teeth 13a on an inner circumferential surface of the drive pulley 13. That is, in the meshed portion, the teeth 44 of the output gear 42 are engaged with and abut against the inner teeth 13a of the drive pulley 13 in the circumferential direction and in the radial direction. This allows rotation of the output gear 42 to be transmitted to the drive pulley 13.

The speed reduction-output member 33 includes an accommodation recess 45, which extends in the direction of the axis L2 from a distal end surface of the output gear 42 to the middle boss 43.

As shown in FIGS. 3A and 3B, the accommodation recess 45 includes a first recess 45a and a second recess 45c. The first recess 45a is located at the bottom (deepest portion) of the accommodation recess 45. The second recess 45c is located at a distal side of the output gear 42. A step 45b is located between the second recess 45c and the first recess 45a. The first recess 45a and the second recess 45c are circular and extend about the axis of the output gear 42 (conforming to axis L2). The first recess 45a has a smaller inner diameter than the second recess 45c. The inner diameter of the second recess 45c is fixed in the direction of the axis L2. Further, the support hole 43a of the middle boss 43 extends through the bottom surface of the first recess 45a. The speed reduction-output member 33, which is a resin molded product, includes the accommodation recess 45 to reduce the radial thickness of the output gear 42 and the middle boss 43 of the speed reduction-output member 33. This reduces the generation of sink marks in the output gear 42 and the middle boss 43, decreases weight, and lowers the material cost of the speed reduction-output member 33.

A rubber O-shaped seal ring 46 is located between an inner circumferential surface of the first recess 45a and the outer circumferential surface of the rod 35b. This restricts the entrance of liquid such as water into between the center post 35 and the speed reduction-output member 33 from the outside. Further, the second recess 45c includes a restriction portion R, which is fitted to the rod 35b.

The restriction portion R includes a washer 47 and a retainer 48. The washer 47, which has the form of an annular plate, is fitted to the rod 35b and accommodated in the second recess 45c. That is, the washer 47 is located in the radial direction between the outer circumferential surface of the rod 35b and an inner circumferential surface of the second recess 45c. Further, the washer 47 abuts against the step 45b of the accommodation recess 45 in the direction of the axis L2.

The retainer 48, which is, for example, a disk-shaped toothed washer pressed from a metal sheet, restricts separation of the speed reduction-output member 33 from the center post 35. In the same manner as the washer 47, the retainer 43 is fitted to the rod 35b and accommodated in the second recess 45c. That is, the retainer 48 is located in the radial direction between the outer circumferential surface of the rod 35b and the inner circumferential surface of the second recess 45c. An inner circumferential portion of the retainer 48 includes engagement pieces 48a, each of which is inclined toward a distal end of the rod 35b. The retainer 48 is press-fitted to the rod 35b so that a distal end of each engagement piece 48a is engaged with and fixed to the outer circumferential surface of the rod 35b. Further, the retainer 48 includes an outer circumferential portion 43b, which abuts against the surface of the washer 47 located at the opposite side of the step 45b. When the retainer 43 is fixed to the rod 35b in such a manner, the position of the speed reduction-output member 33 is held in the direction of the axis L2 relative to the center post 35. This restricts separation of the speed reduction-output member 33 from the center post 35.

In the restriction portion R, the washer 47 and the retainer 48 are stacked in contact with each other in the direction of the axis L2. The washer 47 is held in the direction of the axis L2 between, the retainer 48 and a portion of the speed reduction-output member 33 that is closer to the output gear 42 (step 45b of the accommodation recess 45). When the speed reduction-output member 33 rotates, the washer 47 rotates while sliding in contact with the retainer 48 fixed to the rod 35b.

The location of the restriction portion R, which includes the washer 47 and the retainer 48, will now be described in detail. The restriction portion R is located in the direction of the axis L2 between the worm wheel 41 and a meshed (abutted) portion X where the teeth 44 of the output gear 42 are meshed with the inner teeth 13a of the drive pulley 13. That is, the restriction portion R and the meshed portion X are located at different positions in the direction of the axis L2. In other words, the restriction portion R is located away from the radially inner side of the meshed portion X within the range of the meshed portion X in the direction of the axis L2. Further, the restriction portion R is located in the direction of the axis L2 between the meshed portion X and a base 35c (basal end) of the rod 35b.

The operation of the present embodiment will now be described.

Rotation of the rotation shaft 24 of the motor 20 is reduced in speed by the worm shaft 32 and the worm wheel 41 and transmitted to the output gear 42. The output gear 42 rotates integrally with the drive pulley 13 of the window regulator 12 so that rotation force of the drive pulley 13 is transmitted through the wire 15 and the fixed member 16 to the window glass WG. This opens and closes the window glass WG.

When engagement with the wire 15 applies an external force P in the radial direction to the drive pulley 13, the output gear 42 receives the radial external force P through the engaged portion X. The external force P, which is received by the output gear 42 at the meshed portion X (teeth 44), is transmitted to the rod 35b through the washer 47 of the restriction portion R accommodated in the accommodation recess 45 (the second recess 45c).

In the present embodiment, the washer 47 is located at a position deviated in the direction of the axis L2 from the meshed portion X (teeth 44) that receives the external force P from the drive pulley 13. This provides distance in the direction of the axis L2 from the meshed portion X, which receives the external force P, to the washer 47. Thus, the output gear 42 effectively absorbs some of the external force P and reduces the stress transmitted to the washer 47 in the radial direction. This reduces the radial stress transmitted from the washer 47 to the rod 35b.

Further, since the washer 47 is located at a position deviated in the direction of the axis L2 from the meshed portion X (teeth 44), the stress applied to the rod 35b from the drive pulley 13 through the speed reduction-output member 33 and the washer 47 acts in the direction of the axis L2 in addition to the radial direction (i.e., axial component of stress is increased). That is, the stress transmitted from the washer 47 to the rod 35b is released in the direction, of the axis L2. This reduces the stress transmitted from the washer 47 to the rod 35b.

The present embodiment has the advantages described below.

(1) The geared, motor 11 includes the restriction portion R, which is located between the outer circumferential surface of the center post 35 (rod 35b) and the inner circumferential surface of the accommodation recess 45 of the speed reduction-output member 33. The restriction portion S restricts movement of the speed reduction-output member 33 relative to the center post 35. The retainer 48 and the washer 47 of the restriction portion R are located in the direction of the axis L2 of the center post 35 at positions that differ from the meshed portion X where the teeth 44 of the output gear 42 are meshed with the inner teeth 13a of the drive pulley 13.

Such a structure obtains distance in the direction of the axis L2 from the meshed portion X, which receives the external force P from the drive pulley 13, to the washer 47. Thus, the output gear 42 effectively absorbs some of the external force P and reduces the radial stress that is transmitted to the washer 47. This reduces the radial stress transmitted from the drive pulley 13 through the speed reduction-output member 33 and the washer 47 to the rod 35b. As a result, damage to the rod 35b is reduced. Further, in the present embodiment, the restriction portion R is located in the speed reduction-output member 33 (accommodation recess 45). Such a structure allows the restriction portion R to easily receive the external force P from the drive pulley 13. In this structure, the advantage obtained from, the restriction portion R arranged as discussed above (i.e., radial stress transmitted to rod 35b is reduced) is remarkable.

(2) The power window device 10 of the present embodiment is a wire-type power window device. More specifically, the drive pulley 13 is coupled to the output gear 42 of the geared motor 11 to open and close the window glass WG by the wire 15 that runs around the drive pulley 13. The wire-type power window device 10 tends to receive a larger radial stress received by the speed reduction-output member 33 from the input member (drive pulley 13) than other types of (for example, arm-type) power window devices. In this structure, the advantage that reduces the radial stress transmitted from the drive pulley 13 to the rod 35b is remarkable.

The above embodiment may be modified as described below.

Figure 4:
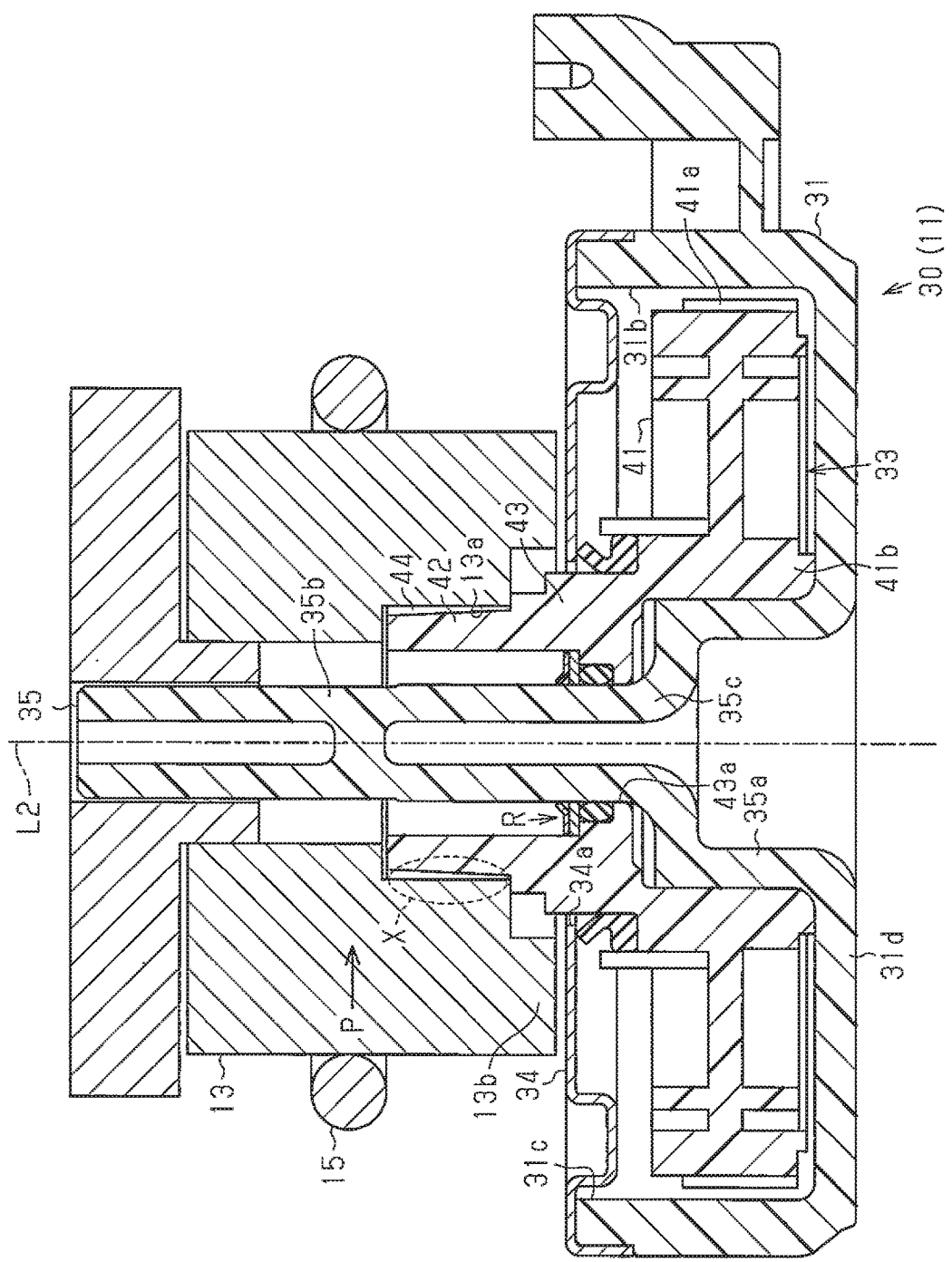
FIG. 4 is a cross-sectional view showing a reduction drive of a geared motor of another example and a drive pulley that is coupled to the reduction drive.

For example, as shown in FIG. 4, the drive pulley 13 may include a tubular extension 13b, which extends in the direction, of the axis L2 toward, the motor (lower side in FIG. 4) rather than toward the inner teeth 13a. The extension 13b is extended to the radially outer side of the middle boss 43 of the speed reduction-output member 33 and opposed to the middle boss 43 with a radial gap located in between. In such a structure, the extension 13b of the drive pulley 13 is extended to the radially outer side of the restriction portion R. However, the extension 13b does not abut in the radial direction against the speed reduction-output member 33. Thus, the radial external force P applied from the drive pulley 13 is not transmitted from the extension 13b to the speed reduction-output member 33. Instead, the external force P is transmitted only from the inner teeth 13a to the speed reduction-output member 33 (output gear 42). That is, in the structure shown in FIG. 4, the restriction portion R is located in the direction of the axis L2 at a position that differs from the meshed portion X. This reduces the radial stress transmitted from the drive pulley 13 through the speed reduction-output member 33 and the restriction portion R (washer 47) to the rod 35b.

Figure 5:
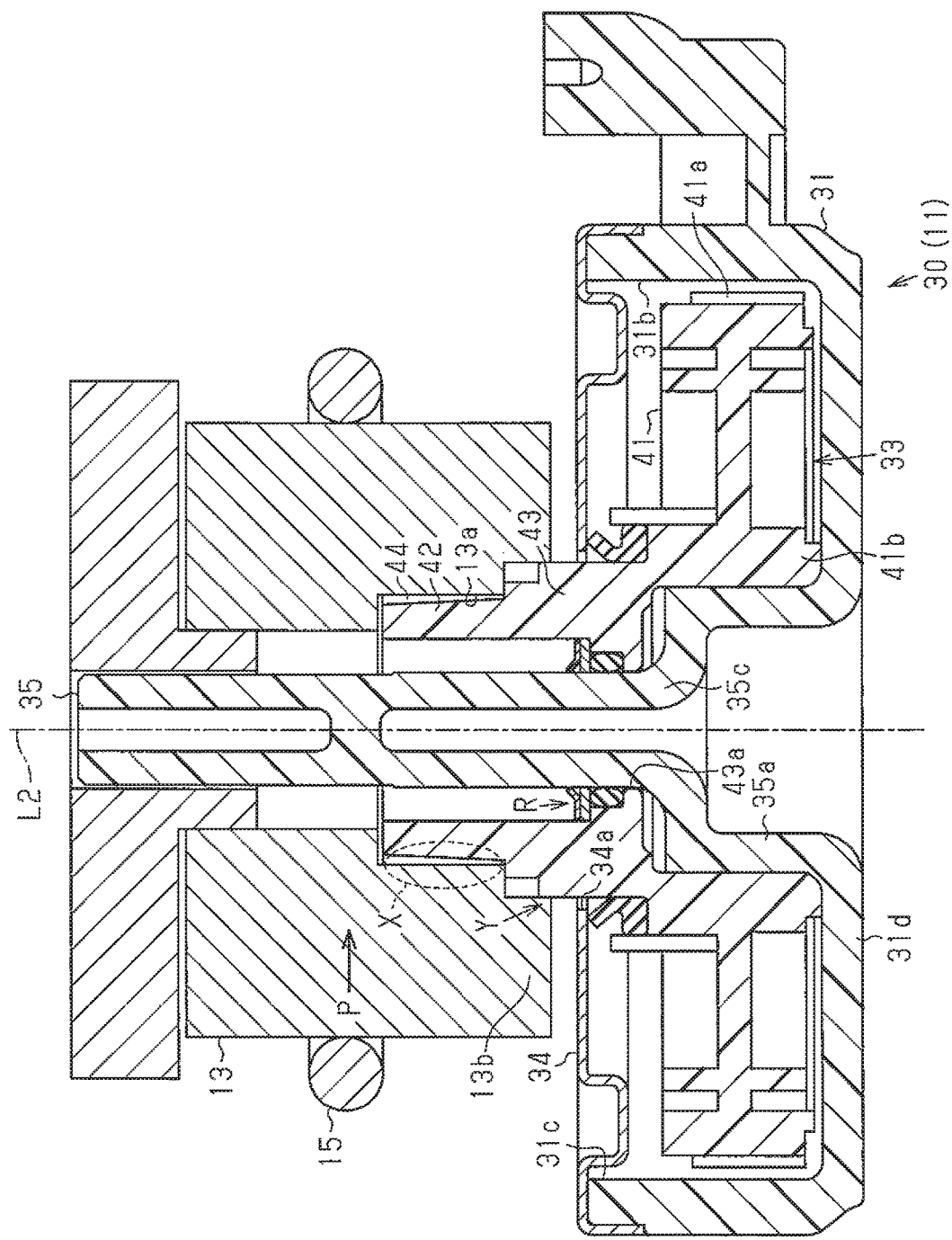
FIG. 5 is a cross-sectional view showing a reduction drive of a geared motor of a further example and a drive pulley that is coupled to the reduction, drive.

As shown in FIG. 5, when the extension 13b of the drive pulley 13 abuts in the radial direction against the outer circumferential surface of the middle boss 43, the radial external force P applied from the drive pulley 13 is transmitted to the speed, reduction-output member 33 from the meshed portion X and an abutted portion Y where the extension 13b abuts in the radial direction against the middle boss 43. Thus, it is preferred that the restriction portion R be located in the direction of the axis L2 at a position that differs from the meshed portion X and the abutted portion Y to reduce the radial stress transmitted from the drive pulley 13 through the speed reduction-output member 33 and the restriction portion R to the rod 35b.

In the example of FIG. 5, the restriction portion R is located in the direction of the axis L2 between the abutted portion Y and the worm wheel 41. That is, the restriction portion R is located at a position deviated in the direction of the axis L2 from the meshed portion X and the abutted portion Y that receive the external force P from the drive pulley 13. This reduces the radial stress transmitted from the drive pulley 13 through the speed reduction-output member 33 and the restriction portion R to the rod 35b.

Further, in the structure shown in FIG. 5, the middle boss 43 of the speed reduction-output member 33 has a larger diameter than the output gear 42. This easily obtains thickness in the radial direction of the middle boss 43. The thick middle boss 43 receives the stress in the radial direction from the drive pulley 13 so that the stress is easily reduced by the middle boss 43. This further reduces the radial stress transmitted from the drive pulley 13 through the speed reduction-output member 33 and the restriction portion R to the rod 35b.

In the above embodiment, the retainer 48 is a disk-shaped toothed washer. Instead, the retainer 48 may be, for example, a lock washer in which the engagement pieces 48a are omitted from the retainer 48 of the above embodiment so that the circular inner circumferential portion can be press-fitted to the rod 35b. Alternatively, the retainer 48 may be an annular C-ring that has an open part.

In the above embodiment, the output gear 42 is formed integrally with the worm wheel 41. Instead, the output gear 42 may be separate from the worm wheel 41.

In the above embodiment, the center post 35 is formed integrally with the resin gear housing 31 (wheel accommodation portion 20b). Instead, the entire center post 35 or just the rod 35b may be separate (for example, metal component) from the gear housing 31.

In the above embodiment, the present invention is applied to the geared motor 11 of the power window device 10. Instead, the present invention may be applied to a geared motor used for a vehicle opening/closing body drive device such as a sunroof device or a sliding door opening/closing device. Alternatively, the present invention may be applied to a geared motor used for other devices such as a windshield wiper device.

In the above embodiment, the material, shape, and structure of each member of the geared motor 11 are examples and may be changed.

In the above embodiment, the teeth 44 of the output gear 42 abut in the radial direction against the inner teeth 13a of the drive pulley 13. However, the teeth 44 do not have to abut in the radial direction against the inner teeth 13a. For example, the bottom of the teeth 44 of the output gear 42 may abut in the radial, direction against the distal end of the inner teeth 13a of the drive pulley 13, and the distal end of the teeth 44 of the output gear 42 may abut in the radial direction against the bottom of the inner teeth 13a of the drive pulley 13.

A technical concept that may be understood from, the above embodiment and other examples will be described below.

(A) A geared motor including:
a motor; and
a reduction drive coupled integrally to the motor, wherein the reduction drive includes a gear housing, a speed reduction-output member, and a restriction portion, wherein
the gear housing includes a support shaft,
the speed reduction-output member includes a reduction gear that reduces a speed of rotation produced by the motor, an output gear that is rotatable integrally with the reduction gear and includes output teeth, and an accommodation recess,
the speed reduction-output member is fitted to the support shaft and rotationally supported by the support shaft,
the restriction portion is configured to restrict movement of the speed reduction-output member relative to the support shaft, wherein the restriction portion is located between an outer circumferential surface of the support shaft and an inner circumferential surface of the accommodation recess, and
the restriction portion is located in an axial direction of the support shaft at a position that differs from a position of the output teeth of the output gear.

In such a structure, the restriction portion is arranged at a position that differs from the teeth of the output gear in the axial direction of the support shaft. This obtains distance in the axial direction from the teeth of the output gear, which receives the radial external force from the input member, to the restriction portion. Thus, the speed reduction-output member effectively absorbs the external force from the input member and reduces the radial stress that is transmitted to the restriction portion. This reduces the radial stress transmitted from the input member through the speed reduction-output member and the restriction portion to the support shaft. As a result, damage to the support shaft is reduced.

The invention claimed is:

1. A geared motor comprising:
a motor; and
a reduction drive coupled integrally to the motor,
wherein the reduction drive includes a gear housing, a speed reduction-output member, and a restriction portion, wherein
the gear housing includes a support shaft,
the speed reduction-output member includes a reduction gear that reduces a speed of rotation produced by the motor, an output gear that is rotatable integrally with the reduction gear and meshed with an input member, and an accommodation recess, the speed reduction-output member is fitted to the support shaft and rotationally supported by the support shaft, the restriction portion is configured to restrict movement of the speed reduction-output member relative to the support shaft, wherein the restriction portion is located between an outer circumferential surface of the support shaft and an inner circumferential surface of the accommodation recess, and the restriction portion is located in an axial direction of the support shaft at a position that differs from a portion where the speed reduction-output member abuts in a radial direction against the input member.

2. A power window device comprising:

the geared motor according to claim 1; and a window body, wherein the power window device is configured to open and close the window body with a wire that runs around the input member.

3. The power window device according to claim 2, wherein the speed reduction-output member of the geared motor includes a large-diameter portion, the large-diameter portion has a larger diameter than the output gear, the large-diameter portion is located between the reduction gear and the output gear, and the input member is configured to abut in the radial direction against the large-diameter portion.

\* \* \* \* \*